United States Patent [19]

Slack

[11] Patent Number: 5,753,749

[45] Date of Patent: May 19, 1998

[54] DICYCLOHEXYLMETHANE DIISOCYANATE RESIDUE-BASED COMPOSITIONS AND THE USE OF SUCH COMPOSITIONS AS FILLERS

[75] Inventor: William E. Slack, Moundsville, W. Va.

[73] Assignee: Bayer Corporation, Pittsburgh, Pa.

[21] Appl. No.: 777,314

[22] Filed: Dec. 27, 1996

[51] Int. Cl.⁶ .............. C08K 5/205; C08K 5/29; C08K 5/06; C08K 5/10; C08L 75/04; C08L 75/06; C08L 75/08; C07C 269/02

[52] U.S. Cl. .............. 524/728; 252/182.2; 252/182.21; 252/182.22; 252/182.24; 252/182.27; 252/182.28; 524/196; 524/198; 524/199; 524/366; 524/377; 524/762; 524/765; 524/773; 525/452; 525/453; 525/454; 525/457; 525/458; 525/460; 528/49; 528/59; 528/67; 528/76; 528/77; 528/80; 528/81; 528/85; 560/115; 560/330; 560/336; 560/354; 521/40.5; 521/49.5

[58] Field of Search .............. 252/182.2, 182.21, 252/182.22, 182.24, 182.27, 182.28; 524/196, 198, 199, 728, 366, 377, 762, 773, 765; 525/452, 453, 454, 457, 458, 460; 528/49, 59, 67, 76, 77, 80, 81, 85; 560/115, 330, 336, 354; 521/40.5, 49.5

[56] References Cited

U.S. PATENT DOCUMENTS 4,507,464  3/1985  Rasshofer .............. 528/288

*Primary Examiner*—Rabon Sergent
*Attorney, Agent, or Firm*—Joseph C. Gil; Lyndanne M. Whalen

[57] ABSTRACT

Urethane-filled compositions are produced by reacting a dicyclohexylmethane diisocyanate residue or a dicyclohexylmethane diisocyanate residue containing mixture with a monofunctional alcohol containing at least one ether group in an amount such that the equivalent ratio isocyanate groups to hydroxyl groups is from about 0.9:1 to about 1:0.9. The diisocyanate residue or residue-containing mixture must contain at least 20% by weight monomeric diisocyanate and have a total NCO content of at least 10%. The diisocyanate residue is produced by phosgenating dicyclohexylmethane diamine in which less than 20% polymeric diamine is present. The urethane filled compositions produced in this manner may then be dissolved in either a polyol or a polyisocyanate and subsequently used to produce polyurethanes in known manner.

17 Claims, No Drawings

DICYCLOHEXYLMETHANE DIISOCYANATE RESIDUE-BASED COMPOSITIONS AND THE USE OF SUCH COMPOSITIONS AS FILLERS

BACKGROUND OF THE INVENTION

The present invention relates to a dicyclohexylmethane 4,4'-diisocyanate ("$H_{12}MDI$") residue-based product which is soluble in polyhydroxyl compounds and isocyanates, an $H_{12}MDI$ residue-based urethane-filled polyhydroxyl or isocyanate compound, to a process for the production of polyhydroxyl compounds filled with an $H_{12}MDI$ residue-based urethane, to a process for the production of polyisocyanates filled with an $H_{12}MDI$ residue-based urethane and to polyurethanes produced from polyhydroxyl or polyisocyanate compounds filled with such $H_{12}MDI$ residue-based urethanes.

$H_{12}MDI$ is generally produced by phosgenating dicyclohexyl-methane diamine ("$H_{12}MDA$"). In the course of producing $H_{12}MDI$ by this process, a non-distillable by-product which is commonly referred to as "$H_{12}MDI$ residue" or "$H_{12}MDI$ bottoms" is generated. The amount of this by-product generated during phosgenation is dependent upon the phosgenation conditions. Major concerns in the production of $H_{12}MDI$ are, therefore, the amount of $H_{12}MDI$ residue generated and whether such $H_{12}MDI$ residue is useful in other applications.

The usefulness of an $H_{12}MDI$ residue is largely dependent upon the heat history of that residue. That is, the longer the residue has been subjected to high heat to remove monomeric $H_{12}MDI$, the more difficult it becomes to work with that by-product. It has generally been found that after the $H_{12}MDI$ monomer content of the $H_{12}MDI$ residue has been reduced to a level below 10%, the remaining residue is a solid at ambient temperature and is insoluble in the commonly used solvents.

Consequently, $H_{12}MDI$ residues containing less than 10% monomeric $H_{12}MDI$ are not generally considered useful and are disposed of by incineration.

It would be advantageous to develop a method for making $H_{12}MDI$ distillation residue sufficiently soluble in polyhydroxyl compounds and in polyisocyanates that it could be made a liquid at ambient temperature without leaving economically impractical amounts of monomeric $H_{12}MDI$ in that residue.

SUMMARY OF THE INVENTION

It is an object of the present invention to provide a $H_{12}MDI$ residue-based composition which is soluble in polyhydroxyl compounds and polyisocyanates at ambient temperature.

It is also an object of the present invention to provide a method for producing a clear liquid $H_{12}MDI$ residue-filled polyhydroxyl compound.

It is a further object of the present invention to provide a method for producing a clear liquid $H_{12}MDI$ residue-filled polyisocyanate.

It is another object of the present invention to provide a liquid, clear, urethane-filled hydroxyl compound which has been produced from $H_{12}MDI$ residue.

It is an additional object of the present invention to provide a liquid, clear, urethane filled polyisocyanate which has been produced from $H_{12}MDI$ residue.

It is a further object of the present invention to provide a process for producing polyurethanes, particularly polyurethane foams, from the urethane-filled polyhydroxyl and/or polyisocyanate compounds that have been produced from $H_{12}MDI$ residue.

These and other objects which will be apparent to those skilled in the art are accomplished by selecting an $H_{12}MDI$ residue generated by phosgenation of $H_{12}MDA$ in which less than 20% by weight polymeric $H_{12}MDA$ was present. The $H_{12}MDI$ residue to be used in the present invention also contains at least 20% by weight monomeric $H_{12}MDI$ and has a total NCO content of at least 10%. $H_{12}MDI$ residue satisfying these criteria and a monofunctional alcohol which contains at least one ether group are reacted in amounts such that the equivalent ratio of isocyanate groups to hydroxyl groups is from about 0.9:1 to about 1:0.9 to produce a urethane group-containing composition that is soluble in polyhydroxyl compounds and in polyisocyanates at ambient temperature. This urethane group containing composition may then be dissolved in a polyhydroxyl compound to produce a urethane-filled, polyhydroxyl composition or in a polyisocyanate to produce a urethane-filled, polyisocyanate composition. This urethane-filled composition may then be used to produce polyurethanes.

DETAILED DESCRIPTION OF THE INVENTION

The present invention relates to a process for generating an $H_{12}MDI$ residue-based composition which is useful as a filler because it is soluble in polyhydroxyl compounds and in polyisocyanates and to urethane-filled hydroxyl and/or polyisocyanate compositions made with such $H_{12}MDI$ residue-based compositions. In this process, an alcohol containing at least one ether group and an $H_{12}MDI$ residue satisfying specific criteria are reacted in amounts such that the equivalent ratio of isocyanate groups to hydroxyl groups is from about 0.9:1 to about 1:0.9, preferably about 1:1.

The $H_{12}MDI$ residues useful in the practice of the present invention must satisfy the following criteria: (1) the residue must have been generated by the phosgenation of dicyclohexylmethane diamine in which less than 20% by weight is polymeric $H_{12}MDA$; (2) the monomeric $H_{12}MDI$ content of the $H_{12}MDI$ residue must be at least 20% by weight; and (3) the total isocyanate group content of the $H_{12}MDI$ and any other isocyanate group containing material present in the residue must be at least 10%.

With respect to the first of these criteria, the polymeric $H_{12}MDA$ content of the diamine to be phosgenated may easily be determined by methods known to those skilled in the art such as gas chromatography. If the polymeric $H_{12}MDA$ content of the diamine is greater than 20%, the mixture may be treated (e.g., by distillation) to reduce the level of polymeric $H_{12}MDA$ to an acceptable level before phosgenation.

The phosgenation of $H_{12}MDA$ may be carried out by any of the methods known to those skilled in the art. Upon completion of that phosgenation, monomeric $H_{12}MDI$ is generally removed from the reaction mixture by distillation. In accordance with the present invention, the reaction mixture may be distilled until up to 80% of the monomeric $H_{12}MDI$ has been recovered. The remaining residue which contains at least 20% by weight monomeric $H_{12}MDI$, preferably at least 30% but no more than 80% by weight monomeric $H_{12}MDI$, and most preferably from about 40 to about 60% by weight monomeric $H_{12}MDI$ and which has an NCO content of at least 10%, preferably from about 20 to about 30%, most preferably from about 20 to about 25% is suitable as a starting material for the process of the present invention. It is preferred, but not required, that any solvent employed in the phosgenation process be removed prior to use of the $H_{12}MDI$ residue in accordance with the present invention.

Any of the known monofunctional alcohols containing one or more ether groups may be reacted with the $H_{12}MDI$ residue satisfying the criteria of the present invention. Such alcohols generally have from 1 to 18 ether groups, preferably from about 4 to about 12 ether groups, most preferably from about 4 to about 8 ether groups and a molecular weight of from about 76 to about 1100, preferably from about 200 to about 500. Suitable ether-containing alcohols include those produced in known manner by reacting one or more starting compounds containing one reactive hydrogen atom with an alkylene oxide such as ethylene oxide, propylene oxide, butylene oxide, styrene oxide and mixtures of such alkylene oxides. Monofunctional polyether alcohols obtained by the addition of ethylene oxide and/or propylene oxide are, however, preferred. Mixtures of such alcohols may also be used.

Examples of suitable starting compounds containing one reactive hydrogen atom include: 1-methoxy-2-propanol, diethylene glycol monobutylether, any of the isomers of butanol, any of the isomers of pentanol and any isomers of other alcohols having a carbon backbone.

In addition to the ether group-containing, monohydroxyl alcohol required for the practice of the present invention, other hydroxyl compounds may also be reacted with the $H_{12}MDI$ residue satisfying the criteria of the present invention. Any of the known hydroxyl compounds may be used, provided that the hydroxyl compound does not contribute more than 20% of the hydroxyl groups present in the mixture to be reacted with the $H_{12}MDI$ residue. Particularly suitable hydroxyl compounds which do not contain ether groups include polyester polyols, short chain diols, and alcohols. Polyether polyols having functionalities greater than 1 are also among the preferred optional hydroxyl compounds.

The $H_{12}MDI$ residue satisfying the criteria of the present invention, an alcohol containing at least one ether group and any optional hydroxyl compound are reacted in amounts such that the equivalent ratio of isocyanate groups to hydroxyl groups is from about 0.9:1 to about 1:0.9, preferably about 1:1. This reaction may be carried out at temperatures of from about 40° to about 120° C., preferably from about 60° to about 90° C. at atmospheric pressure until no NCO groups are present. The presence of NCO groups may be readily determined by those skilled in the art.

The reaction product is a urethane group containing an $H_{12}MDI$ residue-based composition which is solid at ambient temperature but which is soluble in polyhydroxyl compounds, polyisocyanates and in most of the commonly used organic solvents (e.g., toluene, methylene chloride and tetrahydrofuran) at ambient temperature. This reaction product may then be dissolved in a polyhydroxyl compound to produce a urethane-filled $H_{12}MDI$ residue-based polyhydroxyl composition. This reaction product may also be dissolved in a polyisocyanate to produce a urethane-filled $H_{12}MDI$ residue-based polyisocyanate.

The polyhydroxyl compounds which are particularly preferred for dissolving the $H_{12}MDI$ residue/ether-containing alcohol product are polyether polyols and polyester polyols.

Polyether polyols useful in dissolving the $H_{12}MDI$ residue-based urethane of the present invention typically have functionalities of from about 2 to about 6, preferably from about 2 to about 4, and molecular weights (number average determined by end group analysis) of from about 200 to about 6,000, preferably from about 500 to about 4800. Examples of such polyether polyols include those obtained in known manner by reacting one or more starting compounds which contain reactive hydrogen atoms with alkylene oxides such as ethylene oxide, propylene oxide, butylene oxide, styrene oxide, tetrahydrofuran, epichlorohydrin or mixtures of these alkylene oxides. Polyethers obtained by addition of ethylene oxide and/or propylene oxide are most preferred. Suitable starting compounds containing reactive hydrogen atoms include polyhydric alcohols (described below as being suitable for preparing polyester polyols); water; methanol; ethanol; 1,2,6-hexane triol; 1,2,4-butane triol; trimethylol ethane; pentaerythritol; mannitol; sorbitol; methyl glycoside; sucrose; phenol; isononyl phenol; resorcinol; hydroquinone; and 1,1,1- or 1,1,2-tris-(hydroxyl phenyl)-ethane.

Polyester polyols useful in the practice of the present invention typically have functionalities of about 2 and molecular weights (number average determined by end group analysis) of from about 400 to about 4,000, preferably from about 500 to about 2,000. Examples of such polyester polyols include the reaction products of polyhydric alcohols (preferably dihydric alcohols to which trihydric alcohols may be added) and polybasic (preferably dibasic) carboxylic acids. In addition to these polycarboxylic acids, corresponding carboxylic acid anhydrides or polycarboxylic acid esters of lower alcohols or mixtures thereof may also be used to prepare the polyester polyols useful in the practice of the present invention. The polycarboxylic acids may be aliphatic, cycloaliphatic, aromatic and/or heterocyclic and they may be substituted, e.g., by halogen atoms, and/or unsaturated. Examples of suitable polycarboxylic acids include: succinic acid; adipic acid; suberic acid; azelaic acid; sebacic acid; phthalic acid; isophthalic acid; trimellitic acid; phthalic acid anhydride; tetrahydrophthalic acid an hydride; hexahydrophthalic acid anhydride; tetrachlorophthalic acid anhydride; endomethylene tetrahydrophthalic acid anhydride; glutaric acid anhydride; maleic acid; maleic acid anhydride; fumaric acid; dimeric and trimeric fatty acids such as oleic acid, which may be mixed with monomeric fatty acids; dimethyl terephthalates and bis-glycol terephthalate. Suitable polyhydric alcohols include: ethylene glycol; 1,2- and 1,3-propylene glycol; 1,3- and 1,4-butylene glycol; 1,6-hexanediol; 1,8-octanediol; neopentyl glycol; cyclohexanedimethanol; 1,4-bis(hydroxymethyl) cyclohexane; 2-methyl-1,3-propanediol; 2,2,4-trimethyl-1, 3-pentanediol; triethylene glycol; tetraethylene glycol; polyethylene glycol; dipropylene glycol; polypropylene glycol; dibutylene glycol and polybutylene glycol; glycerine and trimethylolpropane. The polyesters may also contain a portion of carboxyl end groups. Polyesters of lactones, e.g., ε-caprolactone or hydroxyl carboxylic acids such as ω-hydroxycaproic acid, may also be used.

The amount of hydroxyl compound in which the $H_{12}MDI$ residue-based composition is dissolved is generally determined on the basis of handling and processing considerations (e.g., viscosity). For most applications, however, the amount of hydroxyl compound used is selected so that the dissolved urethane-group containing $H_{12}MDI$ residue-based composition will be present in a quantity of from about 10 to about 60% by weight, preferably from about 20 to about 40% by weight.

The urethane filled polyisocyanate produced from the $H_{12}MDI$ residue/ether alcohol reaction product may be made with any of the known polyisocyanates by dissolving the urethane product in the polyisocyanate in amounts of from about 10 to about 60% by weight. The specific amount of polyisocyanate used will be dependent upon viscosity and handling requirements.

Isocyanates in which the $H_{12}$MDI/ether alcohol reaction product may be dissolved include aliphatic, cycloaliphatic, araliphatic, aromatic and heterocyclic isocyanates, modified isocyanates and isocyanate-terminated prepolymers. Examples of such isocyanates include: diisocyanates such as m-phenylene diisocyanate, p-phenylene diisocyanate, 2,4-toluene diisocyanate, 2,6-toluene diisocyanate, 1,6-hexamethylene diisocyanate, 1,4-hexamethylene diisocyanate, 1,3-cyclohexane diisocyanate, 1,4-cyclohexane diisocyanate, hexahydrotoluene diisocyanate and its isomers, isophorone diisocyanate, dicyclohexyl-methane diisocyanate, 1,5-naphthalene diisocyanate, 1-methyl-phenyl-2,4-phenyl diisocyanate, 4,4'-diphenylmethane diisocyanate, 2,4'-diphenylmethane diisocyanate, 4,4'-biphenylene diisocyanate, 3,3'-dimethoxy4,4'-biphenylene diisocyanate and 3,3'-dimethyl4,4'-biphenylene diisocyanate; triisocyanates such as 2,4,6-toluene triisocyanate; and polyisocyanates such as 4,4'-dimethyl-diphenyl-methane-2,2',5,5'-tetraisocyanate and the polymethylene polyphenylpolyisocyanates.

Modified isocyanates are obtained by chemical reaction of diisocyanates and/or polyisocyanates. Modified isocyanates useful in the practice of the present invention include isocyanates containing ester groups, urea groups, biuret groups, allophanate groups, carbodiimide groups, isocyanurate groups, uretdione groups and/or urethane groups. Preferred examples of modified isocyanates include prepolymers containing NCO groups and having an NCO content of from about 25 to about 35% by weight, preferably from about 28 to about 32% by weight. Prepolymers based on polyether polyols or polyester polyols and diphenylmethane diisocyanate are particularly preferred. Processes for the production of these prepolymers are known in the art.

The most preferred polyisocyanates for the production of rigid polyurethanes are methylene-bridged polyphenyl polyisocyanates and prepolymers of methylene-bridged polyphenyl polyisocyanates having an average functionality of from about 1.8 to about 3.5 (preferably from about 2.0 to about 3.1) isocyanate moieties per molecule and an NCO content of from about 25 to about 35% by weight, due to their ability to crosslink the polyurethane.

The $H_{12}$MDI residue-based urethane filled polyhydroxyl and polyisocyanate compositions of the present invention are particularly useful for the production of polyurethanes, particularly polyurethane foams. The urethane filled polyhydroxyl compositions of the present invention may be reacted with any of the known and commercially available isocyanates by any of the known methods for producing polyurethanes. Examples of suitable isocyanates include those described above as being suitable for dissolving the $H_{12}$MDI/ether alcohol reaction product.

The urethane filled polyisocyanate compositions of the present invention may be reacted with any of the known isocyanate-reactive compounds known to those skilled in the art by any of the methods known to those skilled in the art. Examples of suitable isocyanate-reactive compounds are the polyethers and polyesters described above as being suitable for dissolving the $H_{12}$MDI/ether alcohol reaction product.

Low molecular weight isocyanate-reactive materials may also be used to produce polyurethanes from the urethane filled polyhydroxyl and/or polyisocyanate compounds of the present invention. Suitable low molecular weight isocyanate-reactive compounds include polyhydric alcohols which have previously been described in the process for the preparation of the polyester polyols and polyether polyols. Dihydric alcohols are preferred. The weight ratio of the low molecular weight to the high molecular weight material containing two or more hydroxyl groups is generally from about 0.001 to about 2, preferably from about 0.01 to about 0.40.

Monofunctional and even small amounts of trifunctional and higher functional compounds generally known in polyurethane chemistry may be used to produce polyurethanes in accordance with the present invention. For example, trimethylolpropane may be used in cases in which slight branching is desired.

Catalysts and solvents may be used to aid the polyurethane-forming reaction. Examples of catalysts useful for promoting urethane reactions include di-n-butyl tin dichloride, di-n-butyl tin diacetate, di-n-butyl tin dilaurate, triethylenediamine and bismuth nitrate. Examples of the useful solvents include: toluene, tetrahydrofuran and chlorobenzene.

Having thus described my invention, the following Examples are given as being illustrative thereof. All parts and percentages given in these Examples are parts by weight and percentages by weight, unless otherwise indicated.

EXAMPLES

The materials used in the Examples which follow were:

| | |
|---|---|
| ALCOHOL A: | 1-butanol |
| ALCOHOL B: | a 1-butanol-started propylene oxide adduct having a molecular weight of 315 and a functionality of 1. |
| POLYETHER A: | a propylene glycol/propylene oxide/ethylene oxide adduct with the ethylene oxide present as a 20% by weight termination having a molecular weight of 4,000 and a functionality of approximately 2.0. |
| POLYETHER B: | a propylene glycol/propylene oxide adduct having a molecular weight of 2,000 and a functionality of approximately 2.0. |
| POLYETHER C: | a glycerine/propylene oxide/ethylene oxide adduct with 17% by weight ethylene oxide termination having a molecular weight of 4,800 and a functionality of approximately 3.0. |
| ISOCYANATE A: | a polyisocyanate made up of 44% by weight methylene diphenyldiisocyanate (42% by weight of the 4,4'-isomer and 2% by weight of the 2,4'-isomer) and 56% by weight of the higher homologs of methylene diphenyldiisocyanate having an NCO content of 31.5%. |
| $H_{12}$MDI RESIDUE: | residue generated by phosgenating a polyamine mixture of 75% by weight dicyclohexylmethane-4,4'-diamine, 7% by weight dicyclohexylmethane-2,4'-diamine and 15% by weight higher homologs of dicyclohexylmethane diamine. The residue contains 49% by weight $H_{12}$MDI monomer and has a total NCO content of 23.9%. |

The procedure used in each of the Examples was as follows:

The amount of $H_{12}$MDI residue indicated in the Table was introduced with stirring into a 1 liter three necked flask equipped with a stirrer and a thermometer. The alcohol indicated in the Table was then introduced into the flask in the amount indicated in the Table. The resultant mixture was then heated to 90° C. and held at that temperature until no free NCO groups remained. The contents of the flask were then dissolved in either a polyether or a polyisocyanate. The appearance and viscosity of the resulting product are reported in the Table.

TABLE

| Examp. | H$_{12}$MDI Resid. (gms) | Alcohol/ grams | Poly ether/ grams | ISO. A/ grams | Appear. | Viscos. at 25° C. mPa · s |
|---|---|---|---|---|---|---|
| 1 | 70 | B/125 | — | 733 | clear | 632 |
| 2 | 70 | B/125 | A/780 | — | clear | 1176 |
| 3 | 70 | B/125 | C/780 | — | clear | 1282 |
| 4 | 70 | B/125 | B/780 | — | clear | 596 |
| 5* | 82 | A/34.5 | — | 469 | turbid with solids | — |

*Comparative Example

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of a urethane-filled composition comprising reacting
   a) a dicyclohexylmethane diisocyanate residue or dicyclohexylmethane diisocyanate residue containing mixture having a total isocyanate group content of at least 10%
      (1) containing at least 20% by weight monomeric dicyclohexyl-methane diisocyanate and
      (2) containing residue generated by phosgenating dicyclohexyl-methane diamine in which less than 20% by weight was polymeric dicyclohexylmethane diamine
   b) a monofunctional alcohol containing at least one ether group in amounts such that the equivalent ratio of isocyanate groups in a) to hydroxyl groups in b) is from about 0.9:1 to about 1:0.9.

2. The process of claim 1 in which a monofunctional hydroxyl compound that does not contain any ether groups is present during the reaction in an amount such that at least 80% of the total hydroxyl groups present are hydroxyl groups from b).

3. The process of claim 1 in which at least one polyfunctional hydroxyl compound is present during the reaction in an amount such that at least 80% of the total hydroxyl groups present are hydroxyl groups from b).

4. The process of claim 1 in which the dicyclohexylmethane diisocyanate residue or dicyclohexylmethane diisocyanate residue containing mixture has a total isocyanate group content of at least 20%.

5. The process of claim 1 in which the alcohol b) contains three ether groups.

6. The process of claim 5 in which alcohol b) is selected from monofunctional polyether alcohols which are addition products of ethylene oxide and/or propylene oxide and a compound containing one reactive hydrogen atom.

7. The process of claim 1 which further comprises the step of dissolving the reaction product in a polyhydroxyl compound.

8. The process of claim 7 in which the polyhydroxyl compound is a polyether polyol.

9. The process of claim 8 in which the polyether polyol has a molecular weight of from about 500 to about 6000 and a functionality of from about 2 to about 6.

10. The process of claim 7 in which the polyhydroxyl compound is a polyester polyol.

11. The process of claim 10 in which the polyester polyol has a molecular weight of from about 400 to about 4,000 and a functionality of about 2.

12. The process of claim 1 which further comprises the step of dissolving the reaction product in a polyisocyanate.

13. The process of claim 12 in which the polyisocyanate is selected from toluene diisocyanate, diphenylmethane diisocyanate or polyphenyl polymethylene polyisocyanate.

14. The clear urethane-filled hydroxyl compound produced by the process of claim 7.

15. The clear urethane-filled polyisocyanate produced by the process of claim 12.

16. A polyurethane produced by reacting the hydroxyl compound of claim 14 with a polyisocyanate.

17. A polyurethane produced by reacting the polyisocyanate of claim 15 with a polyhydroxyl compound.

* * * * *